United States Patent
Trageser (10) Patent No.: US 10,300,928 B2
(45) Date of Patent: May 28, 2019

(54) TRAILER LOAD MONITORING

(71) Applicant: Robert Bosch GmbH, Stuttgart (DE)

(72) Inventor: Vern Trageser, Mt. Pleasant, SC (US)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 15/420,551

(22) Filed: Jan. 31, 2017

(65) Prior Publication Data

US 2018/0215394 A1  Aug. 2, 2018

(51) Int. Cl.
*B60P 3/10* (2006.01)
*B60W 30/18* (2012.01)
*B60W 40/13* (2012.01)
*B60W 50/14* (2012.01)

(52) U.S. Cl.
CPC ........... *B60W 50/14* (2013.01); *B60P 3/1033* (2013.01); *B60W 30/18036* (2013.01); *B60W 40/13* (2013.01); *B60Y 2300/18033* (2013.01); *B60Y 2400/30* (2013.01)

(58) Field of Classification Search
CPC .......... B60W 50/14; B60W 30/18036; B60W 40/13; B60K 37/00; B60K 2350/1008; B60P 3/1033; B60P 3/1022; B60Y 2300/18033; B60Y 2400/30

USPC .......................................................... 701/70
See application file for complete search history.

(56) References Cited

U.S. PATENT DOCUMENTS

| | | |
|---|---|---|
| 5,396,857 A | 3/1995 | Emery, Jr. |
| 5,850,175 A | 12/1998 | Yeilding |
| 7,798,263 B2 | 9/2010 | Tandy, Jr. et al. |
| 9,056,535 B2 | 6/2015 | Materna et al. |
| 2010/0131182 A1* | 5/2010 | Deegan .................. G01G 19/08 701/124 |
| 2018/0128672 A1* | 5/2018 | Park ..................... G01G 19/022 |

* cited by examiner

*Primary Examiner* — Aaron L Troost
*Assistant Examiner* — Paula L Schneider
(74) *Attorney, Agent, or Firm* — Michael Best & Friedrich LLP (57) ABSTRACT

Methods and systems for monitoring a load in a trailer coupled to a vehicle. One method includes determining, with an electronic processor, an initial weight on a rear axle of the vehicle when the load is engaged with the trailer coupled to the vehicle. The method also includes monitoring, with the electronic processor, a current weight on the rear axle of the vehicle based on data collected by a sensor. The method also includes comparing, with the electronic processor, the initial weight and the current weight. The method also includes automatically generating, with the electronic processor, a notification when the current weight is different than the initial weight by a predetermined threshold.

20 Claims, 6 Drawing Sheets

TRAILER LOAD MONITORING

FIELD

Embodiments described herein relate to methods and systems for monitoring a load in a trailer coupled to a vehicle.

SUMMARY

To launch a watercraft (for example, a boat) from a trailer coupled to a vehicle, the driver of the vehicle reverses the vehicle, and ultimately the trailer, down a slopped incline (for example, a boat launch) toward a body of water. Once the trailer is far enough in the body of the water, the watercraft will disengage the trailer. In other words, the watercraft will float off the trailer and become supported by the body of water as opposed to being fully supported by the trailer.

When launching the watercraft, it is difficult for the driver of the vehicle to determine when the trailer is far enough in the body of water for the watercraft to disengage the trailer. Accordingly, the driver of the vehicle risks backing the trailer, the vehicle, or both too far into the body of water, which may damage the trailer, the vehicle, or both.

Similarly, when a vehicle is towing a trailer with a load, the driver of the vehicle may not be able to visually see a load in the trailer. Therefore, the driver may not notice when the load in the trailer changes position or disengages with the trailer and, thus, may not take any remedial actions to ensure that the load is properly positioned within the trailer.

Accordingly, embodiments described herein provide methods and systems for monitoring the position of a load in a trailer coupled to a vehicle. For example, some embodiments may be used to determine when a watercraft disengages a trailer coupled to a vehicle. The methods and systems described here may monitor the position of a load in a trailer by monitoring a weight on the rear axle of the vehicle. In some embodiments, the methods and systems monitor the weight on the rear axle of the vehicle using one or more sensors, such as sensors included in an active suspension system of the vehicle.

One embodiment provides a method of monitoring a load in a trailer coupled to a vehicle. The method includes determining, with an electronic processor, an initial weight on a rear axle of the vehicle when the load is engaged with the trailer coupled to the vehicle. The method also includes monitoring, with the electronic processor, a current weight on the rear axle of the vehicle based on data collected by a sensor. The method also includes comparing, with the electronic processor, the initial weight and the current weight. The method also includes automatically generating, with the electronic processor, a notification when the current weight is different than the initial weight by a predetermined threshold.

Another embodiment provides a system for monitoring a load in a trailer coupled to a vehicle. The system includes a sensor and an electronic processor. The electronic processor is configured to determine an initial weight on a rear axle of the vehicle when the load is engaged with the trailer coupled to the vehicle. The electronic processor is also configured to monitor a current weight on the rear axle of the vehicle based on data collected by the sensor. The electronic processor is also configured to compare the initial weight and the current weight. The electronic processor is also configured to automatically generate a notification when the current weight is different than the initial weight by a predetermined threshold.

Yet another embodiment provides a non-transitory computer-readable medium including instructions that, when executed by an electronic processor, cause the electronic processor to perform a set of functions. The set of functions includes determining an initial weight on a rear axle of a vehicle when a load is engaged with a trailer coupled to the vehicle. The set of functions also includes monitoring a current weight on the rear axle of the vehicle based on data collected by a sensor. The set of functions also includes comparing the initial weight and the current weight. The set of functions also includes automatically generating a notification when the current weight is different than the initial weight by a predetermined threshold.

Other aspects of the invention will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1A:
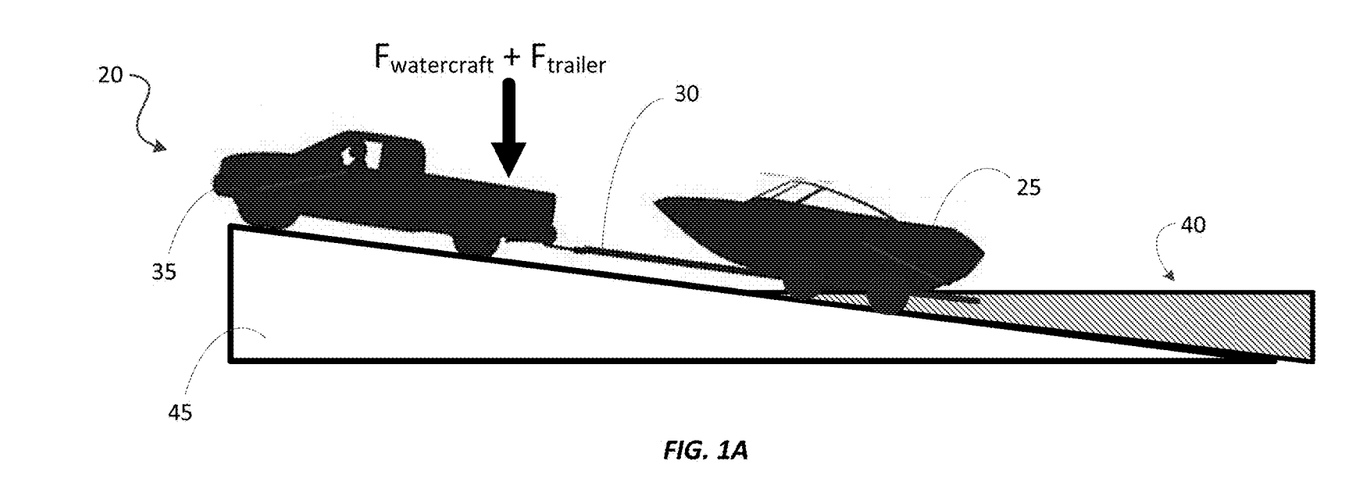
FIG. 1A schematically illustrates a vehicle launching a watercraft, where the watercraft is engaged with a trailer coupled to the vehicle.
Figure 1B:
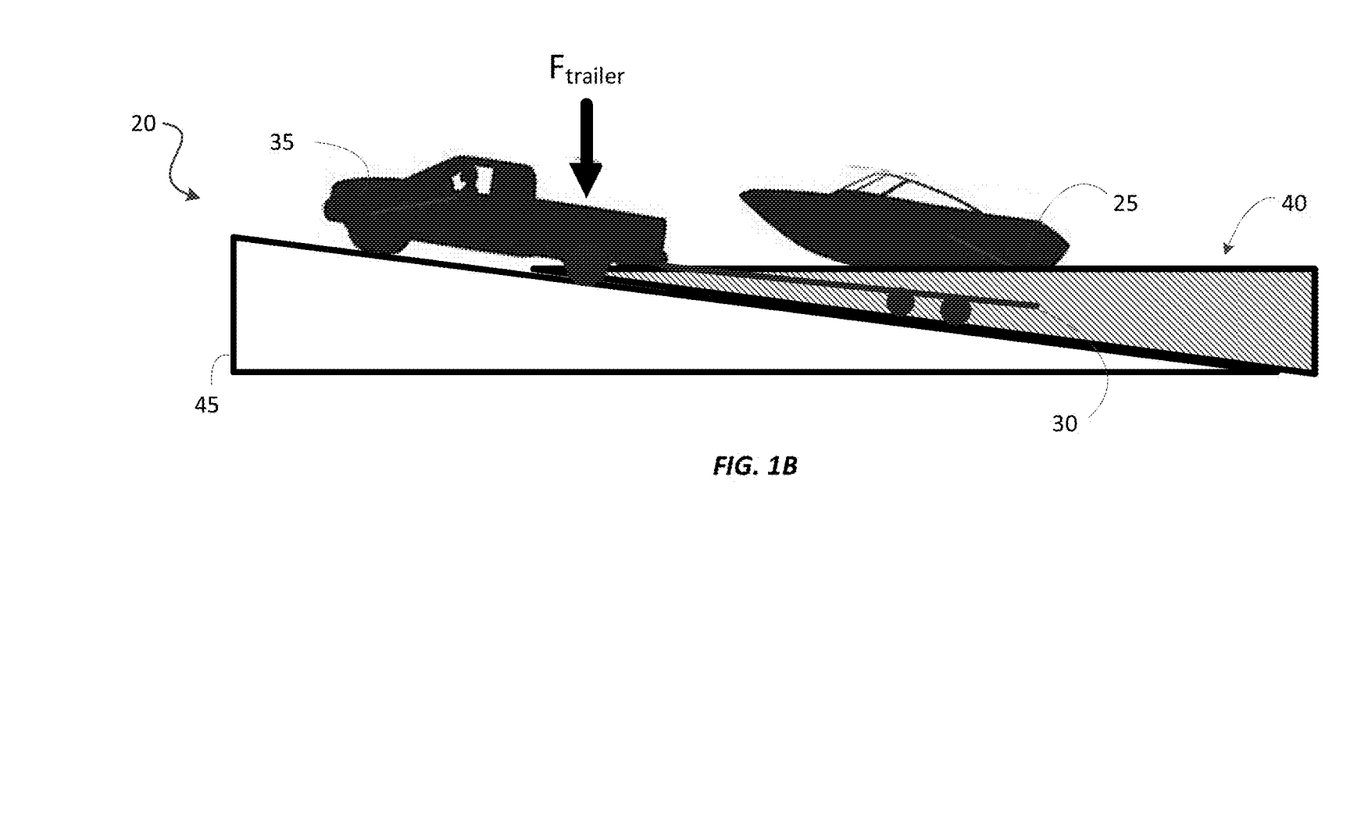
FIG. 1B schematically illustrates the vehicle launching the watercraft, where the watercraft is disengaged with the trailer coupled to the vehicle.

FIGS. 1A and 1B illustrate a system 20 for launching a watercraft 25 (for example, a boat). As illustrated in FIG. 1A, the watercraft 25 is engaged with (for example, fully supported by) a trailer 30 coupled to a vehicle 35. A driver of the vehicle 35 may maneuver the vehicle 35 to launch the watercraft 25 into a body of water 40 (for example, a lake, a pond, or the like). In particular, the driver of the vehicle 35 may reverse the vehicle 35 down a sloped incline 45 (for example, a boat launch) toward the body of water 40, which causes the trailer 30 to at least partially enter the body of water 40. As the driver of the vehicle 35 continues to reverse the vehicle 35 toward the body of water 40, more of the trailer 30 enters the body of water 40. Once the trailer 30 is far enough into the body of water 40, the watercraft 25 will disengage the trailer 30, as illustrated in FIG. 1B. For example, once the trailer 30 is far enough in the body of water 40, the watercraft 25 will float off the trailer 30 and become supported by the body of water 40 as opposed to being supported by the trailer 30. As noted above, it may be difficult for the driver of the vehicle 35 to accurately identify when the trailer 30 is far enough in the body of water 40 for the watercraft 25 to disengage the trailer 30. Accordingly, the driver of the vehicle 35 risks reversing the trailer 30, the vehicle 35, or both too far into the body of water 40, which may damage the trailer 30, the vehicle 35, or both.

When the trailer 30 is engaged with the watercraft 25, a rear axle of the vehicle 35 experiences a weight (for example, a force) associated with the trailer 30 ($F_{trailer}$) and the watercraft 25 ($F_{watercraft}$). Accordingly, as illustrated in FIG. 1A, when the watercraft 25 is engaged with the trailer 30, the weight applied to the rear axle of the vehicle 35 may be defined as $F_{trailer}+F_{watercraft}$. However, when the watercraft 25 disengages the trailer 30, the rear axle of the vehicle 35 may only experience a weight associated with the trailer 30 ($F_{trailer}$). For example, as illustrated in FIG. 1B, when the watercraft 25 disengages the trailer 30, the weight applied to the rear axle of the vehicle 35 may be defined as $F_{trailer}$. In other words, the weight applied to the rear axle of the vehicle 35 decreases when the watercraft 25 disengages the trailer 30 as the rear axle of the vehicle 35 no longer experiences the weight applied by the watercraft 25 ($F_{watercraft}$). It should be understood that the rear axle of the vehicle 35 may experience other forces not described herein when the watercraft 25 is engaged with the trailer 30, when the watercraft 25 is disengaged with the trailer 30, or both.

Figure 2:
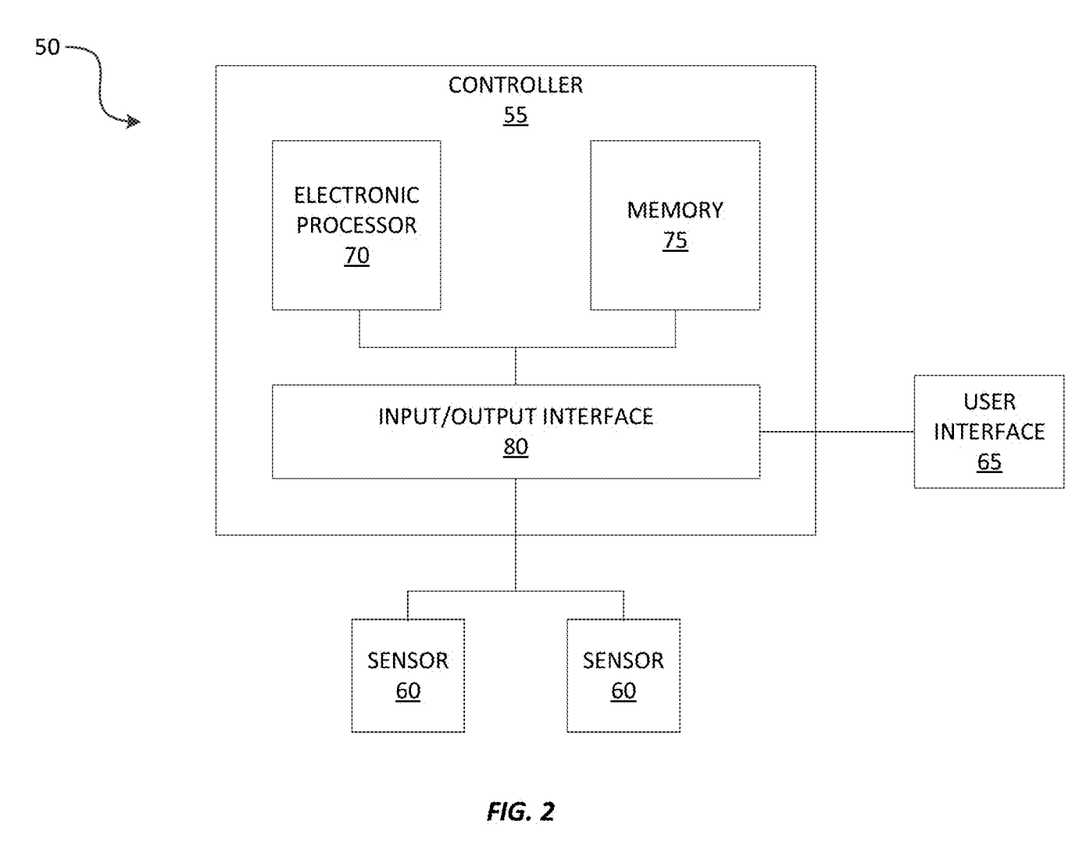
FIG. 2 schematically illustrates a system for determining when a watercraft disengages a trailer coupled to a vehicle in accordance with some embodiments.

FIG. 2 illustrates a system 50 for determining when the watercraft 25 disengages the trailer 30. The system 50 includes a controller 55, a sensor 60, and a user interface 65. In some embodiments, the system 50 may include fewer, additional, or different components than illustrated in FIG. 2. For example, in some embodiments, the system includes multiple sensors 60.

The controller 55 includes combinations of hardware and software that are operable to, among other things, perform the methods described herein. The controller 55 may include an engine or motor controller. However, in other embodiments, the controller 55 may operate independently of a separate engine or motor controller included in the vehicle 35. In some embodiments, the controller 55 is included in an active suspension system (for example, a smart suspension system) associated with the vehicle 35.

As illustrated in FIG. 2, the controller 55 includes an electronic processor 70 (for example, a microprocessor, an application specific integrated circuit, or other suitable electronic device), a memory 75 (for example, one or more non-transitory computer-readable storage mediums), and an input/output interface 80. The electronic processor 70, the memory 75, and the input/output interface 80 communicate wirelessly, over one or more data connections or buses, or a combination thereof. The controller 55 illustrated in FIG. 2 represents one example, and, in some embodiments, the controller 55 may include fewer, additional, or different components in different configurations than illustrated in FIG. 2. Also, in some embodiments, the controller 55 performs functionality in addition to the functionality described herein.

The electronic processor 70 is configured to retrieve instructions from the memory 75 and execute the instructions to perform a set of functions, including the methods described herein. The memory 75 may include combinations of different types of memory, such as read-only memory ("ROM"), random access memory ("RAM"), or another non-transitory computer readable medium. As noted above, the memory 75 stores instructions executed by the electronic processor 70. The memory 75 may also store data. Accordingly, the memory 75 may store firmware, one or more applications, program data, filters, rules, one or more program modules, and other executable instructions or data.

The input/output interface 80 allows the controller 55 to communicate with devices external to the controller 55 (for example, receive input and provide output to and from devices external to the controller 55 directly or indirectly). For example, the controller 55 may communicate with the sensor 60, the user interface 65, or a combination thereof through the input/output interface 80. In some embodiments, the input/output interface 80 may include a port for receiving a wired connection to the sensor 60, the user interface 65, or a combination thereof. Alternatively or in addition, the input/output interface 80 may include a transceiver for establishing a wireless connection to the sensor 60, the user interface 65, or a combination thereof (for example, over a communication network, such as the Internet, a local area network ("LAN"), a wide area network, and the like). Alternatively or in addition, the input/output interface 80 may communicate with a communication bus (for example, a controller area network ("CAN")) to indirectly communicate with the sensor 60, the user interface 65, or a combination thereof.

The user interface 65 receives input from and provides output to a driver of the vehicle 35. The input received through the user interface 65 may include user selections relating to launching the watercraft 25, such as user selections to activate the system 50, to set one or more user preferences associated with the system 50, and the like. The output provided through the user interface 65 may include information relating to launching the watercraft 25, such as a notification indicating that the watercraft 25 has disengaged the trailer 30. In some embodiments, the user interface 65 is a display device positioned within the driver compartment of the vehicle 35, such as on a dashboard of the vehicle 35. In some embodiments, the display device is a touch screen that displays information and also receives user input. Alternatively or in addition, the user interface 65 may include one or more input mechanisms, such as buttons, a keypad, dials, and the like, for receiving user input.

The sensor 60 collects data relating to launching the watercraft 25 (for example, force data, pressure sensor, proximity data, and the like). The sensor 60 may include, for example, a force sensor, a pressure sensor, a proximity sensor, an image sensor, and the like. For example, the sensor 60 may include a force sensor positioned on a trailer hitch of the vehicle 35, a proximity sensor positioned on the trailer 30, an image sensor positioned on the vehicle 35, or a combination thereof. Also, in some embodiments, the sensor 60 includes a sensor for detecting the weight applied to the rear axle of the vehicle 35. In some embodiments, the sensor 60 includes one or more preexisting sensors available on the vehicle 35, such as a backup camera. For example, the sensor 60 may include a sensor in an active suspension system of the vehicle 35.

Figure 3:
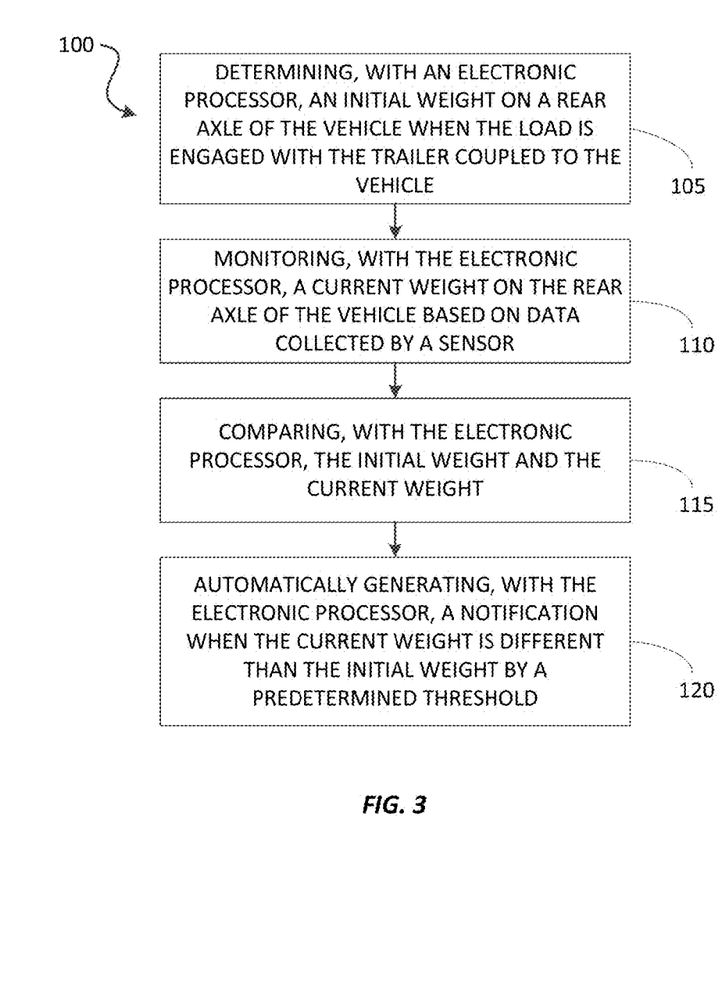
FIG. 3 is a flowchart illustrating a method for determining when a watercraft disengages a trailer coupled to a vehicle performed by the system of FIG. 2 in accordance with some embodiments.

As noted above, the electronic processor 70 included in the controller 55 executes instructions to determine when the watercraft 25 disengages the trailer 30. In particular, the electronic processor 70 executes instructions to perform the method 100 illustrated in FIG. 3 to determine when the watercraft 25 disengages the trailer 30 coupled to the vehicle 35. As illustrated in FIG. 3, the method 100 includes determining, with the electronic processor 70, an initial weight on the rear axle of the vehicle 35 when the watercraft 25 is engaged with the trailer 30 coupled to the vehicle 35 (at block 105). As mentioned above, with respect to FIG. 1A, when the watercraft 25 is engaged with the trailer 30, the weight applied to the rear axle of the vehicle 35 may be defined as $F_{trailer}+F_{watercraft}$. In some embodiments, the electronic processor 70 determines the initial weight on the rear axle of the vehicle 35 by analyzing data received through the input/output interface 80 of the controller 55 from the sensor 60. For example, the sensor 60 may collect data relating to the weight on the rear axle, the weight of the trailer 30 coupled to the vehicle 35 ($F_{trailer}$), the weight of the watercraft 25 ($F_{watercraft}$), or a combination thereof ($F_{trailer}+F_{watereraft}$). The electronic processor 70 may store the initial weight in, for example, the memory 75 of the controller 55.

In some embodiments, the electronic processor 70 determines the initial weight on the rear axle of the vehicle 35 in response to input received via the user interface 65. For example, the driver of the vehicle 35 may activate the system 50 using the user interface 65. When the driver of the vehicle 35 activates the system 50, the electronic processor 70 may determine the initial weight on the real axle of the vehicle 35 in response to the activation of the system 50.

After the electronic processor 70 determines the initial weight on the rear axle of the vehicle 35, the electronic processor 70 monitors a current weight on the rear axle of the vehicle 35 (at block 110). The electronic processor 70 may monitor the current weight on the rear axle of the vehicle 35 based on data collected by the sensor 60. For example, in some embodiments, the electronic processor 70 monitors the current weight on the rear axle of the vehicle 35 by (repeatedly) analyzing data received through the input/output interface 80 of the controller 55 from the sensor 60. The electronic processor 70 may store the current weight in, for example, the memory 75 of the controller 55. For example, as the electronic processor 70 analyzes the data received from the sensor 60, the electronic processor 70 may temporarily store the analyzed data in the memory 75 of the controller 55.

The electronic processor 70 then compares the initial weight and the current weight (at block 115). In some embodiments, the electronic processor 70 compares the initial weight and the current weight to determine whether the current weight is different than the initial weight by a predetermined threshold. As noted above, when the watercraft 25 disengages the trailer 30, the weight applied to the rear axle of the vehicle 35 decreases. Accordingly, in some embodiments, the predetermined threshold represents a difference between a weight (for example, the initial weight) applied to the rear axle of the vehicle 35 when the watercraft 25 is supported by the trailer 30 ($F_{trailer}+F_{watercraft}$) and a weight applied to the rear axle of the vehicle 35 when the watercraft 25 is no longer supported by the trailer 30 (in example, is fully supported by the body of water 40) ($F_{trailer}$). In other words, the predetermined threshold may represent a drop in weight applied to the rear axle of the vehicle 35 when the watercraft 25 disengages the trailer 30 (in example, becomes fully supported by the body of water 40). In some embodiments, the electronic processor 70 continuously compares the initial weight to the monitored current weight while the system 50 remains activated.

When the current weight is different than the initial weight by the predetermined threshold, the electronic processor 70 automatically generates a notification (at block 120). The notification may include an audible notification, a visual notification, a tactile notification, or a combination thereof. In some embodiments, the electronic processor 70 automatically generates and displays the notification on the user interface 65. The notification may indicate that the watercraft 25 has disengaged the trailer 30.

Alternatively or in addition, the electronic processor 70 may determine when the current weight is different than the initial weight by a plurality of predetermined thresholds. For example, in some embodiments, the electronic processor 70 is configured to determine when the current weight is different than the initial weight by a first predetermined threshold and a second predetermined threshold. The first predetermined threshold may be less than the second predetermined threshold. For example, in some embodiments, the first predetermined threshold is less than the second predetermined threshold. Accordingly, the first predetermined threshold may represent when the watercraft 25 is at least partially supported by the body of water 40 and partially supported by the trailer 30 coupled to the vehicle 35, and the second predetermined threshold may represent when the watercraft 25 is fully supported by the body of water 40 (for example, when the watercraft 25 disengages the trailer 30). Accordingly, in this embodiment, the electronic processor 70 may be configured to generate a plurality of notifications, wherein each of the plurality of notifications is associated with one of the plurality of predetermined thresholds. For example, the electronic processor 70 may generate a first notification when the current weight is different than the initial weight by the first predetermined threshold and generate a second notification when the current weight is different than the initial weight by the second predetermined threshold. Each notification may indicate what threshold has been satisfied (for example, whether the watercraft 25 is partially or fully supported by the body of water 40).

Alternatively or in addition to generating and displaying a plurality of notifications, the electronic processor 70 may modify an existing notification displayed via the user interface 65, such as the first notification, when the current weight is less than the initial weight by each of the plurality of predetermined thresholds. The electronic processor 70 may modify an existing notification by modifying a size, a color, a shape, an animation, or a combination thereof of the existing notification. For example, when the current weight is different than the initial weight by the first predetermined threshold, the electronic processor 70 may generate and display a notification in a first color, such as yellow, via the user interface 65. However, when the current weight is different than the initial weight by the second predetermined threshold, the electronic processor 70 may modify the color of the initial notification to a second color, such as red.

Alternatively or in addition, the electronic processor 70 may be configured to automatically generate an emergency stop command when the current weight is different than the initial weight. For example, the electronic processor 70 may generate the emergency stop command when the current weight is less than the initial weight by a second predetermined threshold and the driver of the vehicle 35 continues to travel in reverse (for example, continues to maneuver the trailer 30 coupled to the vehicle 35 further into the body of water 40). The emergency stop command may be a notification as described above, a vehicle control command, or a combination thereof. For example, in some embodiments, when the electronic processor 70 automatically generates the emergency stop command, the electronic processor 70 displays an emergency stop notification via the user interface 65 (for example, on a dashboard display device in the driver compartment of the vehicle 35) to instruct the driver of the vehicle 35 that he or she should stop reversing the vehicle 35 to avoid potential damage to the vehicle 35, the trailer 30, or both. Alternatively or in addition, when the electronic processor 70 automatically generates the emergency stop command, the electronic processor 70 may execute a vehicle control command, such as a brake command, that prevents the vehicle 35 from continuing to travel in reverse. It should be understood that the electronic processor 70 may be configured to execute the vehicle control command directly or may transmit a signal to another vehicle component to execute the vehicle control command.

Figure 4A:
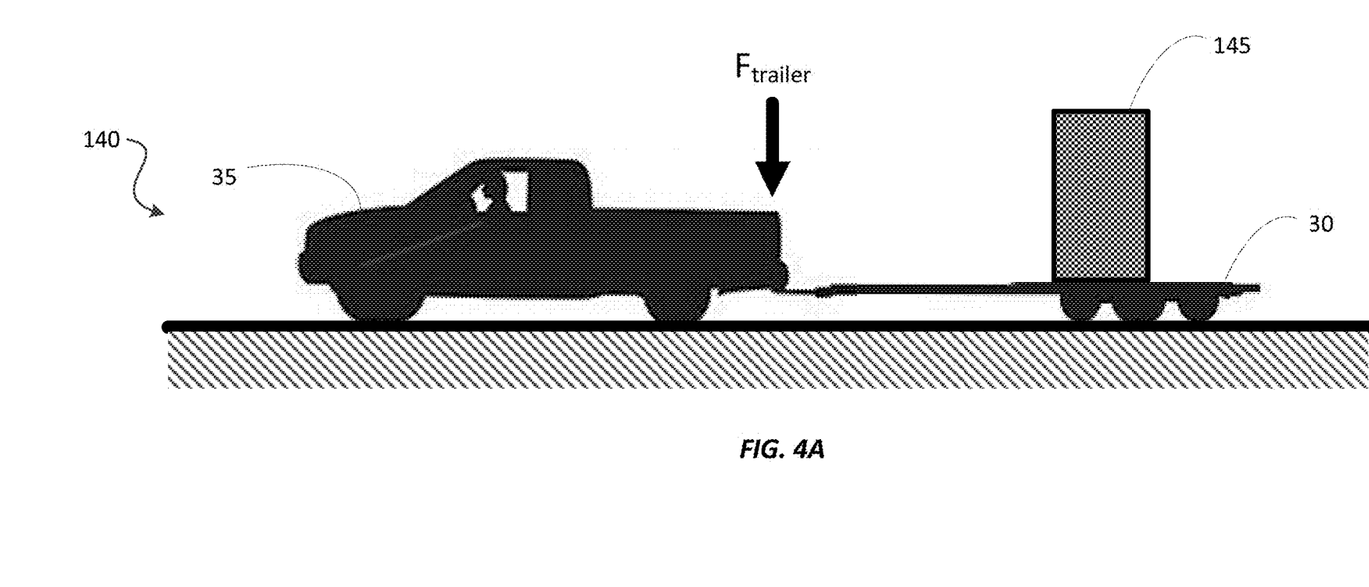
FIGS. 4A and 4B schematically illustrate a vehicle transporting a load in a trailer coupled to the vehicle.
Figure 4B:
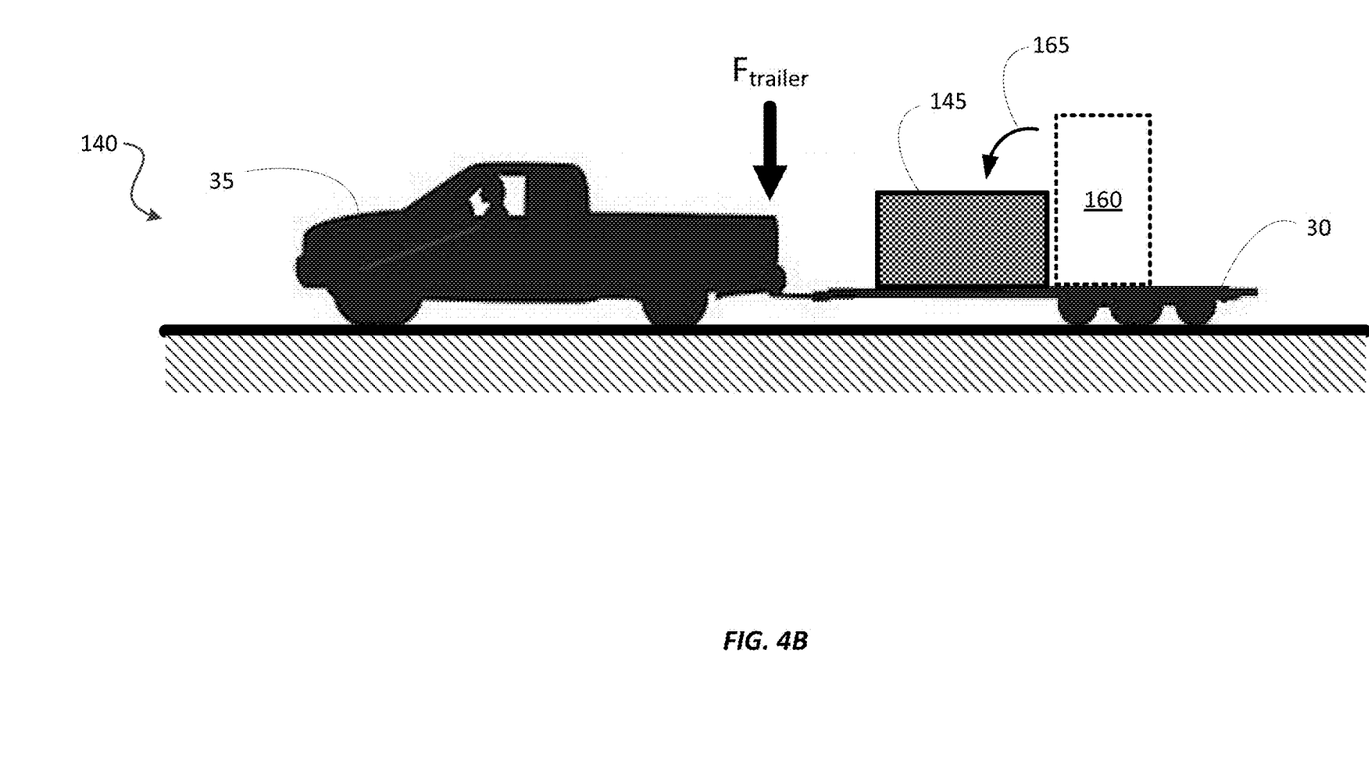

As noted above, the methods and systems described above may also be used to generally monitor the position of a load in a trailer coupled to a vehicle, regardless of whether the load is a watercraft, another vehicle, a packing crate, or other cargo. For example, when transporting any type of load using a trailer, a driver of the vehicle coupled to the trailer may not be able to identify when a load engaged with the trailer changes position, including when the load shifts position within the trailer or disengages the trailer. When such a change in position occurs, the load may fall off the trailer or may create an unstable condition for the load, the trailer, the vehicle, or a combination thereof. For example, FIGS. 4A and 4B illustrate a system 140 for transporting a load 145. FIG. 4A illustrates the load 145 engaged with a trailer 30 coupled to a vehicle 35 in a first (or original) position 160. As a driver maneuvers the vehicle 35 to transport the load 145, the load 145 may shift, as illustrated by arrow 165, to a second position from the first position 160. It should be understood that a change in position of the load 145 may include a change in horizontal position with respect to a surface of the trailer 30, a change in vertical position with respect to a surface of the trailer 30, or a combination thereof (including a change in orientation where the load 145 tips over, rolls, or the like).

Accordingly, the systems and methods described herein may be used to monitor a position of a load in a trailer by monitoring a weight on the rear axle of the vehicle. For example, in some embodiments, the electronic processor 70 determines an initial weight of the load 145 engaged with the trailer 30, as similarly described above with respect to block 105 of FIG. 3. The initial weight may represent a weight distribution of the load 145 when the load 145 is initially positioned on (engaged with) the trailer 30. The initial weight distribution associated with the trailer 30 may include, for example, a weight experienced by a front portion of the trailer 30 and a back portion of the trailer 30, a weight experienced by each wheel of the trailer 30, and the like. During transportation of the load 145, the electronic processor 70 may monitor a current weight on the rear axle of the vehicle based on data collected by the sensor 60, as similarly described above with respect to block 110 of FIG. 3. In some embodiments, the initial weight, the current weight, or a combination thereof may be updated over time to allow for gradual position changes of the load 145. For example, when the load 145 moves three centimeters over ten minutes, the electronic processor 70 may set a new initial weight that reflects the current weight at the end of the ten minutes. In other words, the electronic processor 70 may set a new initial weight at the end of a predetermined time period to allow for minor, gradual changes in position of the load 145.

The electronic processor 70 may compare the initial weight and the current weight and automatically generate a notification based on the comparison, as similarly described above with respect to block 115 and block 120 of FIG. 3, respectively. The notification generated by the electronic processor 70 may alert a driver of the vehicle that the load 145 has changed position. In some embodiments, the notification generated by the electronic processor 70 may also specify a current position of the load 145. For example, the initial weight may indicate that the load 145 was initially positioned on a back portion of the trailer 30, as illustrated in FIG. 4A. However, during transport of the load 145, the current weight may indicate that the load 145 is currently positioned on a front portion of the trailer 30, as illustrated in FIG. 4B. Accordingly, the electronic processor 70 may generate a notification indicating that the load 145 has shifted towards the vehicle 35. As another example, the electronic processor 70 may generate a notification indicating that the load 145 has disengaged the trailer 30 when the comparison indicates a sudden drop in or lack of a current weight distribution. As described above, the notifications may be textual, graphical, audible, tactile, or any combination thereof. Also, in some embodiments, the electronic processor 70 may generate different types of notifications based on how much the position of the load 145 shifts and may initiate one or more automatic actions (such as an emergency stop command) based on the change in position of the load 145 as described above.

The methods and systems described herein may be automatically initiated. In some embodiments, the sensor 60 may detect when the trailer 30 is coupled to the vehicle 35. For example, when a backup camera of the vehicle 35 or a force sensor positioned in the hitch of the vehicle 35 detects the presence of the trailer 30, the methods and systems described herein may be automatically initiated. In further example, when a positioning system, such as a global positioned system (GPS), of the vehicle 35 detects that the vehicle 35 is currently positioned in close proximity to a body of water and reversing toward the body of water or positioned on a decline, the methods and systems described relating to detecting the disengagement of the watercraft 25 herein may be automatically initiated. In some embodiments, the methods and systems described herein may also be initiated based on the transmission of the vehicle 35. For example, when the transmission of the vehicle 35 is set to a towing or hauling transmission, the methods and systems described herein may be initiated. Alternatively or in addition, the methods and systems described herein may be manually initiated by a user. For example, a dashboard display (for example, the user interface 65) may receive input from a driver of the vehicle that initiates the methods and systems described herein.

Thus, embodiments provide, among other things, methods and systems for determining when a watercraft disengages a trailer coupled to a vehicle. The methods and systems described herein generate a notification when the watercraft disengages the trailer by monitoring a weight on the rear axle of the vehicle. In some embodiments, the methods and systems monitor the weight on the rear axle of the vehicle with one or more sensors, such as sensors available on the vehicle, sensors included in an active suspension system of the vehicle, and the like. It should be understood that other techniques may be used to detect when a watercraft has disengaged a trailer, such as by using radar or a camera to detect the presence of the watercraft at a particular position (or a change in such position), detecting water reaching a particular position on the trailer on the vehicle, or the like.

Various features and advantages of the invention are set forth in the following claims.

What is claimed is:

1. A system for monitoring a load in a trailer coupled to a vehicle, the system comprising:
   a sensor; and
   an electronic processor configured to
      determine an initial weight on a rear axle of the vehicle when the load is engaged with the trailer coupled to the vehicle,
      monitor a current weight on the rear axle of the vehicle based on data collected by the sensor,
      compare the initial weight on the rear axle of the vehicle and the current weight on the rear axle of the vehicle,
      automatically generate a notification when the current weight on the rear axle of the vehicle is different than the initial weight on the rear axle of the vehicle by a predetermined threshold, and
      display the notification on a user interface included in the vehicle.

2. The system of claim 1, wherein the sensor includes at least one selected from a group consisting of a force sensor, a pressure sensor, an image sensor, and a sensor included in an active suspension system of the vehicle.

3. The system of claim 1, wherein the electronic processor is configured to generate the notification when the current weight is less than the initial weight by the predetermined threshold and wherein the electronic processor is further configured to generate a second notification when the current weight is greater than the initial weight by a second predetermined threshold.

4. The system of claim 1, wherein the electronic processor is further configured to generate a second notification when the current weight is different than the initial weight by a second predetermined threshold, wherein the first predetermined threshold is less than the second predetermined threshold.

5. The system of claim 1, wherein the electronic processor is configured to automatically generate the notification by modifying an existing notification.

6. The system of claim 5, wherein the electronic processor modifies the existing notification by modifying at least one selected from a group consisting of a size, a color, a shape, and an animation of the existing notification.

7. The system of claim 1, wherein the notification includes at least one selected from a group consisting of an audible notification, a visual notification, and a tactile notification.

8. The system of claim 1, wherein the notification indicates that the load engaged with the trailer has changed positions.

9. The system of claim 1, wherein the load is a watercraft and wherein the notification indicates that the watercraft has disengaged from the trailer.

10. The system of claim 9, wherein the electronic processor is further configured to automatically generate an emergency stop command when (i) the current weight is less than the initial weight by a second predetermined threshold and (ii) the vehicle continues to travel in reverse.

11. The system of claim 10, wherein the emergency stop command includes at least one selected from a group consisting of an emergency stop notification and a vehicle control command that prevents the vehicle from continuing to travel in reverse.

12. The system of claim 1, wherein the initial weight represents an initial weight distribution of the trailer and the current weight represents a current weight distribution of the trailer.

13. The system of claim 1, wherein the electronic controller is further configured to automatically generate a brake command that slows or stops the vehicle when the current weight on the rear axle of the vehicle is different than the initial weight on the rear axle of the vehicle by the predetermined threshold.

14. A method for monitoring a load in a trailer coupled to a vehicle, the method comprising:
   determining, with an electronic processor, an initial weight on a rear axle of the vehicle when a load is engaged with the trailer coupled to the vehicle;
   monitoring, with the electronic processor, a current weight on the rear axle of the vehicle based on data collected by a sensor;
   comparing, with the electronic processor, the initial weight on the rear axle of the vehicle and the current weight on the rear axle of the vehicle;
   automatically generating, with the electronic processor, a notification when the current weight on the rear axle of the vehicle is different than the initial weight on the rear axle of the vehicle by a predetermined threshold; and
   displaying the notification on a user interface included in the vehicle.

15. The method of claim 14, further comprising generating a second notification when the current weight is different than the initial weight by a second predetermined threshold.

16. The method of claim 14, further comprising setting a new initial weight corresponding to the current weight after a predetermined time period.

17. The method of claim 14, further comprising automatically generating a brake command that slows or stops the vehicle when the current weight on the rear axle of the vehicle is different than the initial weight on the rear axle of the vehicle by the predetermined threshold.

18. Non-transitory computer-readable medium including instructions that, when executed by an electronic processor, cause the electronic processor to perform a set of functions, the set of functions comprising:
- determining an initial weight on a rear axle of a vehicle when a load is engaged with a trailer coupled to the vehicle;
- monitoring a current weight on the rear axle of the vehicle based on data collected by a sensor;
- comparing the initial weight on the rear axle of the vehicle and the current weight on the rear axle of the vehicle;
- automatically generating a notification when the current weight on the rear axle of the vehicle is different than the initial weight on the rear axle of the vehicle by a predetermined threshold; and
- displaying the notification on a user interface included in the vehicle.

19. The set of functions of claim 18, further comprising generating a second notification when the current weight is different than the initial weight by a second predetermined threshold different than the first predetermined threshold.

20. The set of functions of claim 18, wherein further comprising automatically generating a brake command that slows or stops the vehicle when the current weight on the rear axle of the vehicle is different than the initial weight on the rear axle of the vehicle by the predetermined threshold.

* * * * *